July 19, 1949.  E. H. SCHMIDT, JR  2,476,389
HEADLIGHT DIMMING SYSTEM
Filed May 23, 1947  2 Sheets-Sheet 1
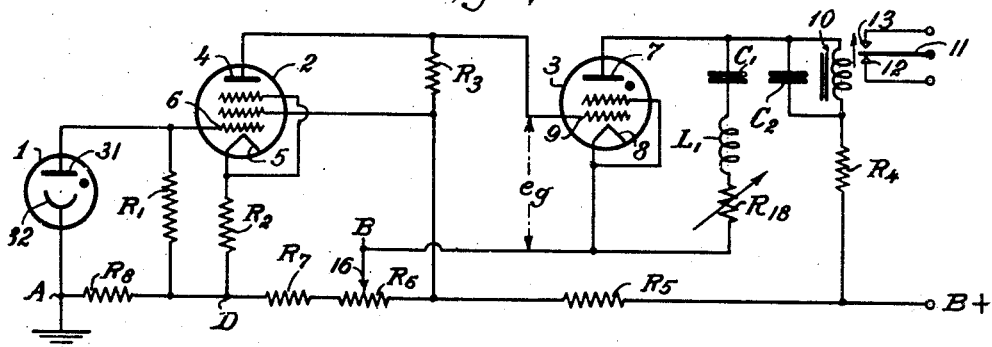
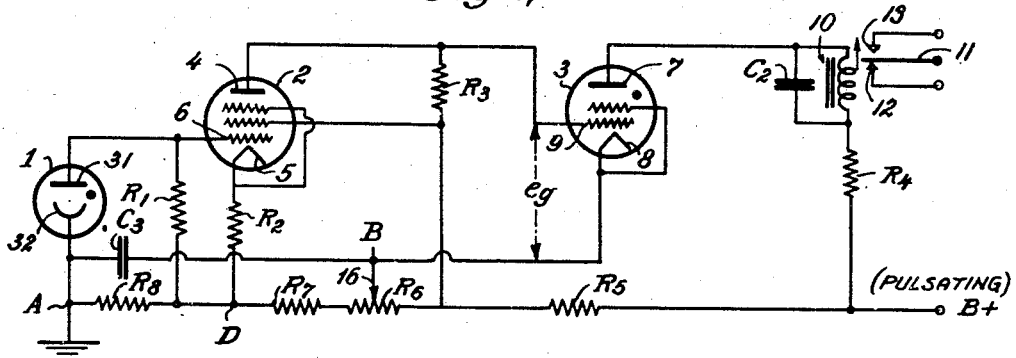
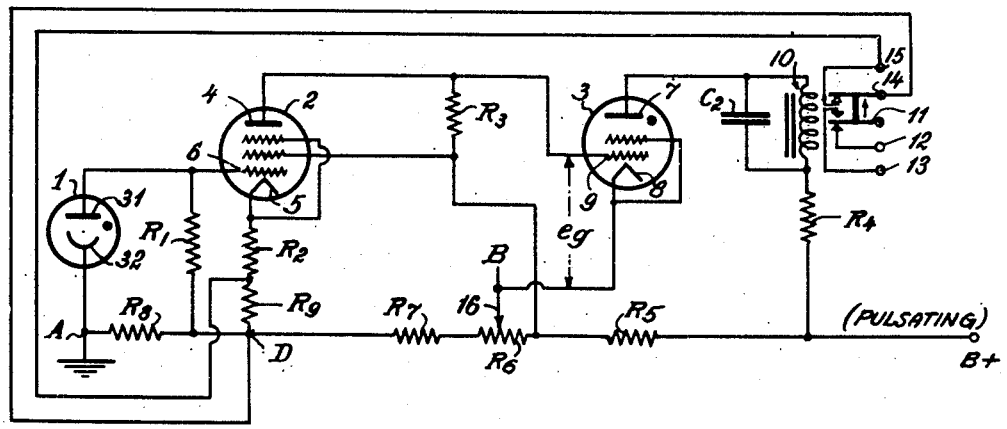
INVENTOR
ERNEST H. SCHMIDT, JR.
BY Pennie, Edmonds, Morton & Barrows
ATTORNEYS July 19, 1949.  E. H. SCHMIDT, JR  2,476,389
HEADLIGHT DIMMING SYSTEM
Filed May 23, 1947  2 Sheets-Sheet 2
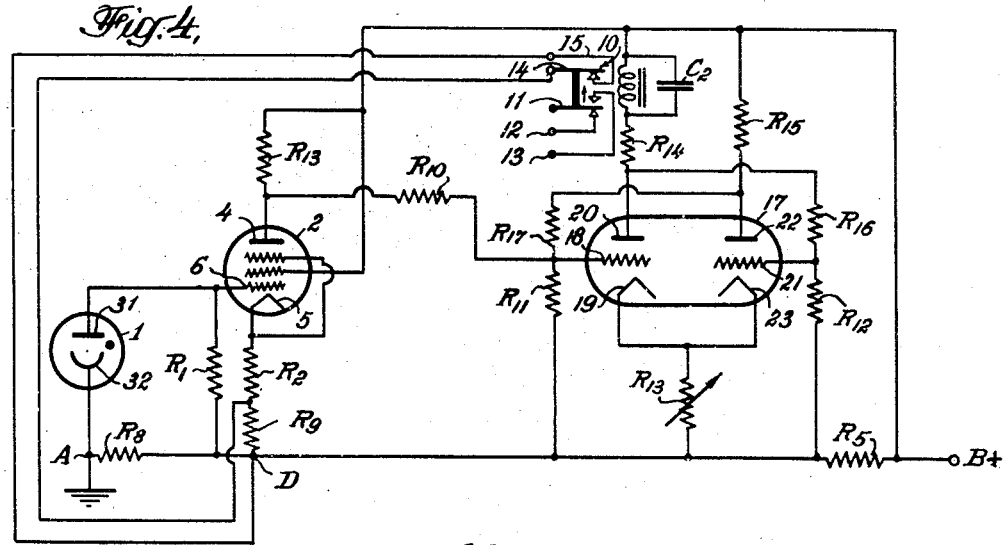
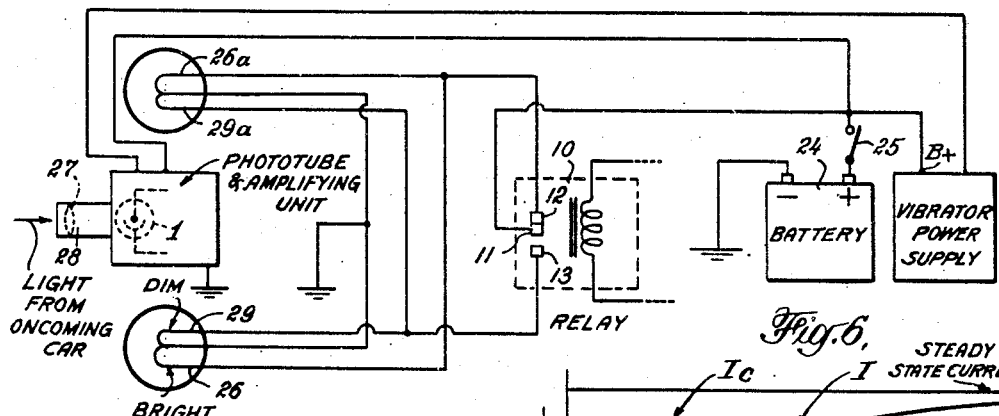
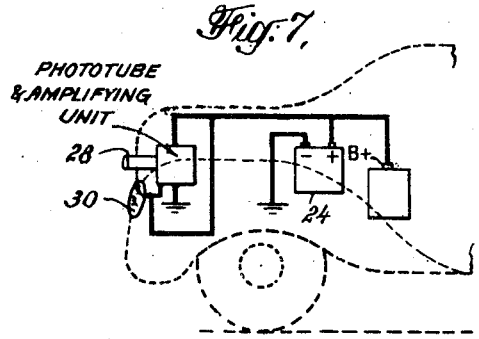
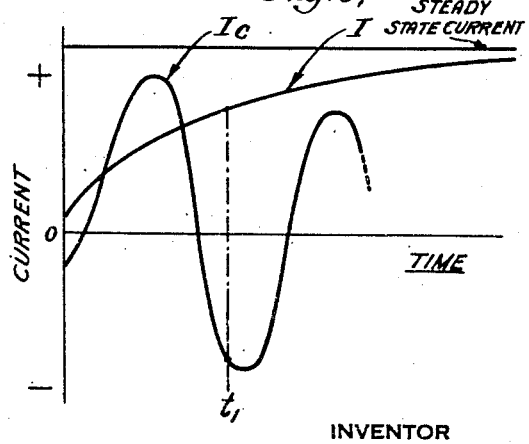
INVENTOR
ERNEST H. SCHMIDT, JR.
BY Pennie, Edmonds, Morton & Barrows
ATTORNEYS Patented July 19, 1949

2,476,389

UNITED STATES PATENT OFFICE 2,476,389

HEADLIGHT DIMMING SYSTEM

Ernest H. Schmidt, Jr., New York, N. Y., assignor to Standard Container, Inc., Rockaway, N. J., a corporation of New Jersey Application May 23, 1947, Serial No. 749,900

7 Claims. (Cl. 250—41.5)

This invention relates to automatic electric control systems, and more especially to the automatic control of vehicular headlights in response to light impinging upon the vehicle from another approaching vehicle.

It is well known that traffic accidents resulting from so-called glaring headlights continue to increase in spite of the fact that in most States there exist statutes requiring the dimming of headlights of vehicles approaching each other on the same road. The mentioned increase of traffic accidents due to glaring headlights is generally considered to result from the non-observance of the "dimming law," whether it be statutory or one of courtesy.

One of the purposes of the present invention is to assure the proper observance of the "dimming law" by automatically controlling the headlights of vehicles rather than by leaving the matter to the option of the drivers of the vehicles. It is appropriate here to point out that to minimize accidents due to glaring headlights it is certainly preferable that all vehicles be equipped with automatic headlight controls as provided by the present invention. It is, nevertheless, a distinct advantage if the headlights of only one of two approaching vehicles are thus automatically controlled because in this event at least one of the drivers is in a position to avoid a collision.

In the past, various arrangements have been proposed for automatically dimming headlights of vehicles for the purpose above set forth. However, it appears that none of these systems has gone into general use because none of them has proved satisfactory. The reason for the unsatisfactory operation of prior systems has been due in large measure to the fact that they were arranged to dim the lights of a first vehicle automatically when the light from the headlights of an approaching second vehicle impinged on the front of the first vehicle with a certain intensity, and the control was again effective to restore the normal brilliancy of the headlights of the first vehicle as soon as the light impinging on the first vehicle dropped below the mentioned intensity. The result of this type of control was that the automatically controlled headlights on the first vehicle would flash alternately bright and dim when passing a series of vehicles coming along the road in the opposite direction, and would also similarly flash if curves or irregularities in the road surface caused the headlights of a single approaching vehicle momentarily to decrease the intensity of the light impinging on the front of the first vehicle.

In an attempt to solve this problem it has been proposed to delay the restoration of the headlights of the first vehicle to full brilliancy by a mechanism such as a dashpot associated with a suitable switch. However, this has not proved to be a satisfactory solution because it merely delays the restoration of the headlights to full brilliancy within an arbitrary time which has no necessary relation to the time delay required under any of a large variety of circumstances. Furthermore, such a delayed control prevents the restoration of the full brilliancy of the headlights on the first vehicle when it is most needed, viz., immediately after the approaching vehicle has passed, and before the eyes of the driver of the first vehicle have become accustomed to the lower light intensity resulting from the absence of the headlights of the approaching vehicle.

The present invention succeeds, where the prior systems failed, by controlling both the dimming and the restoration of the headlights of the vehicle to full brilliancy in response to predetermined variations in the intensity of light impinging on the front of the vehicle. The system is so arranged that the restoration to full brilliancy does not occur until this intensity decreases to a value lower than the value of intensity at which the brilliant lights were initially dimmed. Thus, in accordance with this invention the "delay" in restoring the lights to full brilliancy is a function of the intensity of the impinging light rather than a function of time. However, under some conditions a small degree of time delay may be desired, and it is, therefore, contemplated that the invention may comprise a combination of both types of delay.

In order to provide a better understanding of the invention, reference is made to the following description taken together with the accompanying drawings, wherein:

Fig. 1 is a circuit diagram of a preferred control system according to the invention;

Figs. 2, 3 and 4 are circuit diagrams of modifications of the system of Fig. 1;

Fig. 5 is a wiring diagram of a headlight control circuit of a vehicle which may be operated by any of the systems of Figs. 1–4, inclusive.

Fig. 6 is a graph which, in part, illustrates the operation of the system of Fig. 1; and Fig. 7 illustrates one manner in which a control system in accordance with the invention may be installed in a vehicle.

Referring first to Fig. 1, a light-sensitive element 1 of the photo-electric tube type is coupled through resistor $R_1$ to the control grid 6 of direct-current amplifier tube 2. Thus, the output potential of the phototube circuit is shown to be amplified by amplifier 2. In the appended claims the term "output potential" is intended to refer to the effective output of the phototube, whether or not it is amplified. The output of tube 2, through anode 4 is directly coupled by resistor $R_3$ to the control grid 9 of gas-discharge tube 3. This tube may be of the so-called "Thyratron" type. The output circuit of tube 3 includes anode 7, relay 10 and current limiting resistor R4. Under some conditions it is preferable to employ a relay provided with delayed deactuation, the time delay period being adjustable. Condenser C2 shunting the relay coil is effective in holding the relay actuated (closed), even though the actuating current momentarily decreases. Such provision is probably more important in the arrangements of Figs. 2 and 3 where the pulsating current supply might otherwise cause chattering or other false operation.

The voltage source B+ may be understood in this instance to comprise a suitable source of direct current such as provided by a battery, or by the usual rectified and filtered high-potential source required by a radio receiver. It is to be assumed that the contacts 12 and 13 of relay 10 are suitably connected to the headlight circuit (as shown in Fig. 5) of the vehicle so that when the armature 11 is in the unactuated position shown, the headlights are connected together for full brilliancy, and when the relay is actuated the connections will dim the headlights. The terms "dim" and "dimming" as employed throughout this specification and the appended claims are intended to include switching from one filament to another of a double filament headlight bulb, and any other equivalent device or means which effectively dims the headlights either by diminishing the light intensity thereof or by shifting the principal beam of light downward or sideways so that it is not directed at the approaching vehicle.

Resistors R5, R6, R7 and R8 are effectively connected in series across the high-potential voltage source and thus provide, among other functions, a voltage divider on which from appropriate points taps are taken off to other circuit elements, as shown. By adjusting the position of tap 16 on resistor R6 it is possible to preselect the initial sensitivity of the control. The manner in which the system of Fig. 1 operates to provide the advantages of the present invention will be understood from the following explanation:

*Operation of Fig. 1*

When light from a remote source, such as an approaching vehicle, impinges upon the photoelectric tube 1 suitably positioned at the front of the vehicle of which electric lamps in the headlights are to be controlled, as shown in Fig. 7, an increase of current flows through resistor R1 in a direction to increase the bias on control grid 6 of amplifier tube 2 with respect to the cathode 5. This results in decreased output current through resistor R3 which increases the potential $e_g$ between the control grid 9 and the cathode 8 of Thyratron 3. If potential $e_g$ is sufficient tube 3 will fire, greatly decreasing the resistance of the path between anode 7 and cathode 8. Hence current will flow in the output or anode circuit of tube 3 in which relay 10 is connected, thus actuating the relay. Since the relay-actuating current is effectively of the direct-current type, the relay 10 will remain actuated until the anode circuit is effectively de-energized, regardless of the potential $e_g$ on the grid 9. However, in the system of Fig. 1 means are provided for periodically de-energizing the anode circuit of tube 3 in order periodically to provide the grid 9 with an opportunity to regain control.

The manner in which the anode circuit of Thyratron tube 3 is periodically de-energized may be briefly explained as follows: Before tube 3 fires, the tube acts as an open circuit, and condenser C1 charges from the source B+ through the load resistor R4 and relay 10. The charge on condenser C1 may vary from a value slightly less than twice the applied direct voltage to a value approximately equal to the applied voltage, depending upon whether or not the load is predominately inductive. The actual charge on the condenser also depends upon the potential at which the tube fires. After the tube fires it is equivalent to a switch of zero resistance in series with a control E. M. F. equal to the voltage drop within the tube between the anode and cathode. Within the operating range of anode current the load current I and the condenser current $I_c$ are independent of each other because the voltage drop within the tube is practically constant. These two currents are represented in the graph of Fig. 6.

When the tube fires the condenser discharges through inductance L1, and the condenser discharge current $I_c$ is a damped sine wave approximately as represented in Fig. 6. This discharge current does not stop when the condenser voltage has fallen to zero but, because of voltage induced in inductance L1, continues to flow until the condenser is charged in the opposite direction to a smaller voltage. The condenser current then again reverses and charges the condenser in the original or positive direction. Thus at a time $t_1$ (represented in Fig. 6) shortly after the condenser current has reversed, this reversed condenser current becomes equal to the supply current. At this instant the anode potential is zero and the tube extinguishes. After extinction of the tube, the condenser discharges through the D. C. supply source and subsequently changes to a positive voltage. If the time required for the condenser voltage to reach a positive value equal to the ionization potential exceeds the de-ionization time of the tube, the grid will regain control.

The "delay" in the operation of the system of this invention by which the control relay 10 is not de-actuated until the light intensity on phototube 1 has decreased considerably below the "threshold" value in response to which the relay was initially actuated, is as follows: Before the Thyratron tube fires, the potential between point A and point B on the voltage divider R5 and R8 may be represented as $E_{AB}$. After this tube fires, the potential across points A, B is increased due to the anode current of tube 3 which now flows between those two points. After the tube has been extinguished this potential equals $$E_{AB} + I_{L_1C_1} R_{AB}$$

(where $I_{L_1C_1}$ is the discharge current of condenser C1 through inductance L1, and is at least equal to the anode current of the tube). Hence, when the tube is extinguished and the grid 9 has regained control, the potential drop across points A and D is greater than at the instant before the tube initially fired. With increased current between points D and A, the potential drop across resistor R8 increases, and with it the current output of phototube 1. Hence, under these conditions, a lower light intensity on phototube 1 will in turn produce sufficient grid voltage $e_g$ on Thyratron 3 to cause this tube to continue to fire. However, as the intensity of light impinging on phototube 1 continues to decrease, with a corresponding decrease of output current from this tube, a value will be reached at which grid potential $e_g$ will be insufficient to fire the tube. When the tube is thus extinguished, the potential between A and B will return to its original value, $E_{AB}$, the relay 10 will be de-actuated and the lamps will again be controlled, viz., will be connected to be bright. As above indicated, a time delay may also be introduced, if desired, by adjusting the delay-action device associated with the relay. A light intensity on phototube 1 corresponding to the higher or threshold value of potential will thereafter be required to cause the tube 3 again to fire. The initial sensitivity of the control may be adjusted, as above indicated, by moving slider 16 along resistor $R_6$. By increasing the resistance value of resistor $R_{18}$ the "lower light intensity" value previously mentioned may be increased, and vice versa.

The modified system of the invention illustrated in Fig. 2 provides essentially the same type of operation as that above described in connection with Fig. 1, but with slightly different and simplified apparatus. Here it is assumed that the source B+ of high voltage provides a pulsating uni-directional current rather than a continuous or substantially continuous direct current as in the embodiment of Fig. 1, such as would be furnished by the usual high voltage power supply, as employed in automobile radio receivers, if the filter elements were omitted. Thus the power supply apparatus is simplified, and also the condenser-inductance circuit, $C_1$—$L_1$, of Fig. 1 is here eliminated because the pulsating nature of the unfiltered anode voltage causes Thyratron tube 3 to extinguish between pulses, and this provides grid 9 with concurrent opportunities to regain control.

The "delay" action described in connection with the system of Fig. 1 is here provided by connecting a suitable condenser $C_3$ between points A and B, as shown. The time-constant produced by condenser $C_3$ and the resistance A, B, must be greater than the cycle time of the pulsating current source B+, and this in turn must be greater than the deionization time of the Thyratron tube 3. Elements of the systems of Figs. 1 and 2 (and of the other figures), insofar as they have corresponding functions, bear the same reference characters.

The operation of the system of Fig. 2 is generally similar to that of Fig. 1 and may be explained as follows:

When light of "threshold" intensity impinges on phototube 1, the output current through resistor $R_3$ increases, and an increased positive potential is impressed upon control grid 9 of Thyratron tube 3, as before. The net potential $e_g$ impressed upon grid 9 with respect to cathode 8 may be adjusted, as before, by means of slider 16 on resistor $R_6$. Again assuming that the mentioned light intensity impresses a corresponding "threshold" potential $e_g$ on tube 3 sufficient to cause it to fire, relay 10 will be actuated, and the anode or load current of tube 3 will flow through the resistors between points A and D, causing the voltage drop across these points to increase. This charges the condenser $C_3$ substantially to the potential AB. As the pulsating current falls to the minimum value which it reaches between pulses, Thyratron 3 will be extinguished, but it will fire again as soon as the anode potential is restored by the next pulse, providing the voltage $e_g$ on the grid has not decreased below the firing point. If, meanwhile, the value of light intensity on phototube 1 decreases, the voltage $e_g$ on tube 3 will tend to drop, but condenser $C_3$ will hold the voltage from point A to point D at a high level so that when the voltage source B+ has completed its cyclic operation, a potential $e_g$ at least as great as that resulting from light of "threshold" intensity, will be impressed upon tube 3. This causes tube 3 to fire periodically at a rate high enough to hold the relay closed (actuated). Thus, having been started to fire periodically in response to the "threshold" or high value of light intensity, the Thyratron 3 will continue to fire until the value of light intensity on tube 1 decreases to a lower value which may be considerably lower than the "threshold" value. As before, the Thyratron will cease firing when the light intensity decreases below the "lower" value.

The modification of the invention shown in Fig. 3 is in most respects similar to that in Fig. 2. Here, however, instead of employing a condenser between point A and point B to maintain the grid potential $e_g$ at a high level when the output of the phototube 1 drops to a lower level, an equivalent result is achieved by inserting a proper biasing resistor $R_9$ in the cathode return connection of amplifier tube 2. By providing an extra set of contacts 14, 15 on relay 10, resistor $R_9$ is open-circuited, viz., connected in the circuit when the relay is actuated.

When the tube 3 fires, relay 10 is actuated, opening contacts 14, 15, effectively inserting resistor $R_9$ in series between grid 6 and cathode 5. As a result, the operating or bias potential on control grid 6 is changed in a direction to decrease the output current of amplifier tube 2. This causes effective voltage $e_g$ impressed on tube 3 to be increased.

The system of Fig. 4 is, in one respect, similar to that of Fig. 3 just described. As before, the resistor $R_9$, connected in series in the grid return circuit, is inserted by the opening of contacts 14, 15 or relay 10 when that relay is energized. The function of resistor $R_9$ is the same as described above in connection with Fig. 3.

The system of Fig. 4 differs from that of Fig. 3 and also from the systems of Figs. 1 and 2 in that a double triode type of tube 17 is substituted for the Thyratron tube 3. This tube is connected as an "Eccles-Jordan" trigger amplifier, frequently known in the art as a "Flip-Flop" circuit. The operation of this type of circuit being well known need not here be described in detail. It is sufficient to point out that in operation, the anode 20 of the input section of the tube which comprises electrodes 18, 19 and 20, normally passes substantially zero anode current. In the system as shown this may be assumed to be the result of insufficient light excitation of photo-electric tube 1. This condition of zero anode current will result if resistor $R_{11}$ is smaller than resistor $R_{12}$, such that grid 18 is normally at lower potential than grid 21 of the output section of tube 17. When light of sufficient intensity impinges upon the phototube 1, an input or "trigger" voltage will be impressed upon grid 18 sufficient to trigger the amplifier, causing the anode current to "flip" from the output section to the input section, viz., from anode 22 to anode 20. Since the circuit of anode 20 includes relay 10, the action last described will actuate relay 10, opening contacts 14, 15, and also opening contacts 11 and 12, and closing contacts 11 and 13 as in Fig. 3.

This "flip" action corresponds to the firing of the Thyratron 3 in the preceding figures. When the intensity of light impinging upon phototube 1, decreases below the lower value above referred to, the increased voltage impressed upon grid 18, due to the effect of the insertion in circuit of resistor $R_9$, will no longer be sufficient to maintain the anode current through anode 20, and the anode current will automatically "flop" to the normal anode 22. With zero current flowing in the circuit of anode 20, relay 10 will be deactuated. This condition thus corresponds to the extinguished condition of Thyratron 3 of the preceding figures.

Resistor $R_{13}$ is of the variable type, and by adjustment thereof the light intensity at which the relay responds can be preselected, and hence the mentioned "delay" in respect to the light intensity can be predetermined.

The diagram of Fig. 5 represents one of many circuit arrangements possible to control the effective brilliancy of the headlights of a vehicle in accordance with the present invention. In this arrangement, a storage battery 24 of the usual automobile type is connected, by closing switch 25, to the two "bright" filaments 26 and $26_a$, if the relay 10 is de-actuated closing contacts 11 and 12, as shown. When light, as from an oncoming vehicle, impinges on phototube 1 through lens 27, enclosed within a suitable shield such as light-directing tube and lens holder 28, the relay 10 will be caused to operate as previously described, opening contacts 11 and 12 and closing contacts 11 and 13. This switches the battery from the "bright" filaments $26_a$ to the "dim" filaments $29_a$.

Fig. 7 is a schematic representation of the system shown in Fig. 5 as it might be installed in a vehicle such as an automobile. It will be noted that the lens-holding light shield 28 is positioned so as to shield light emanating from headlight 30 from impinging on the phototube within the "Phototube and amplifying unit." In some instances this shielding effect can conveniently result from the positioning of the units, whereby parts of the vehicle itself, such as portions of the body or the like, act as shielding means.

In order that the present invention may readily be constructed and successfully utilized as herein described, certain values of circuit elements are suggested below. These values apply more especially to the presently preferred circuit arrangement of Fig. 1. They are here given solely by way of example, and are not to be construed as a limitation of this invention of which various modifications and adaptations will be apparent to those skilled in the art.

Tube $V_1$—type 921
Tube $V_2$—type 6SJ7
Tube $V_3$—type 2D21
B+—350 volts (approx.)

*Resistors*

$R_1$—17 megohms
$R_2$—30,000 ohms
$R_3$—250,000 ohms
$R_4$—5,000 ohms
$R_5$—7,000 ohms
$R_6$—5,000 ohms
$R_7$—2,000 ohms
$R_8$—10,000 ohms
$R_{13}$—0–15,000 ohms

*Condensers*

$C_1$—.005 mfd.
$C_2$—4 mfd.

*Inductance*

$L_1$—5 mh.

What is claimed is:

1. In apparatus for automatically actuating a circuit-controlling device in response to the intensity of light emanating from a light source, the combination which comprises a photo-electric element having an output potential which is a function of the intensity of the light impinging on said element, a potential-controlled tube coupled to said element and having an output circuit, said device being connected in the output circuit of said tube, said tube being operative in response to a certain threshold potential and unresponsive to a certain lower potential considerably less than said threshold potential, and means actuated by current flowing through said tube automatically maintaining the potential impressed on said tube at least at said threshold potential when said output potential is within the range between two values corresponding to said threshold and said lower potentials, whereby said device will be actuated when light of an intensity corresponding to at least said threshold potential impinges on said element, and will be de-actuated only when said intensity decreases to a value corresponding to a potential at least as low as said lower potential.

2. In apparatus for automatically controlling an electric lamp in response to light emanating from a remote source first when the intensity of said light is of at least a predetermined threshold value and second when said intensity decreases to a lower value considerably less than said threshold value, said apparatus comprising in combination, a photo-electric tube having an output current which is a function of the intensity of the light impinging on said tube, a potential-controlled gas-discharge tube, an amplifier tube having an output current and connected to couple said photo-electric tube to said gas-discharge tube, an electric lamp controlled by said gas-discharge tube, said gas-discharge tube being operative to fire in response to a threshold potential and incapable of firing at lower potentials including a certain lower potential considerably less than said threshold potential, means causing said gas-discharge tube to extinguish and fire periodically when a threshold potential is impressed thereon, and means actuated by output current from said gas-discharge tube and including a resistor connected to one of said tubes for automatically effectively maintaining the potential impressed on said gas-discharge tube at least at said threshold potential when the output potential of said amplifier is decreasing and is within the range between said threshold and lower potentials.

3. Apparatus for automatically dimming a headlight of a first vehicle in response to light emanating from an oncoming second vehicle when the intensity of said light intercepted by said second vehicle is equal to at least a predetermined threshold value, and for restoring the normal brilliancy of said headlight when the intensity of said intercepted light decreases to a predetermined lower value considerably less than said threshold value, comprising in combination, a photo-electric tube positioned to receive said light and having an output current which is a function of the intensity of the light impinging thereon, a potential-controlled tube having a control grid and an anode, an amplifier tube connected to amplify the output of said photo-electric tube, the output of said amplifier tube being coupled to the control grid of said potential-controlled tube, headlight-controlling relay means connected to be activated by current flowing in the anode circuit of said potential-controlled tube, a source of unidirectional voltage, a voltage divider effectively connected across said voltage source, connections from at least one of said tubes to said voltage divider through which operating potential is furnished thereto, and means operated in response to the output current of said photo-electric tube at said threshold value for automatically increasing the current through at least a part of said voltage divider to a value high enough to maintain said operating potential and thus to continue activation of said relay means when said light decreases from said threshold value to any value between said threshold and lower values.

4. Apparatus according to claim 3 wherein said means for automatically increasing said current comprises a condenser and an inductance connected in series between the anode of said potential-controlled tube and a point on said voltage divider.

5. Apparatus according to claim 4 characterized in that said voltage divider comprises resistance effectively connected across said voltage source, and said condenser and inductance are connected to said resistance by means of an adjustable contact device.

6. Apparatus according to claim 3 wherein said voltage divider comprises resistance effectively connected across said voltage source, connections from taps on said resistance to said photoelectric tube and said amplifier tube being provided to furnish operating potentials thereto, and wherein said means for automatically increasing the current through said voltage divider comprises a condenser connected across a portion of said voltage divider.

7. Apparatus for automatically dimming a headlight of a first vehicle in response to light emanating from an oncoming second vehicle when the intensity of said light intercepted by said second vehicle is equal to at least a predetermined threshold value, and for restoring the normal brilliancy of said headlight when the intensity of said light decreases to a predetermined lower value considerably less than said threshold value, comprising in combination, a photo-electric tube positioned to receive said light and having an output current which is a function of the intensity of the light impinging thereon, a potential-controlled tube having a control grid and a cathode, an amplifier tube having at least cathode, anode and grid electrodes, connected to amplify the output of said photo-electric tube, the output of said amplifier tube being coupled to the control grid of said potential-controlled tube, headlight-controlling relay means connected to be activated by current flowing in the anode circuit of said potential-controlled tube, a source of unidirectional voltage, a voltage divider comprising resistance effectively connected across said voltage source, connections from electrodes of a plurality of said tubes to said voltage divider for furnishing operating potentials to said electrodes, a biasing resistor included in one of said connections, and contacts on said relay means arranged, when closed, to open-circuit said resistor, whereby activation of said relay means automatically changes the bias on said amplifier tube in a sense to increase the potential on said potential-controlled tube.

ERNEST H. SCHMIDT, Jr.

REFERENCES CITED

The following references are of record in the file of this patent:

UNITED STATES PATENTS

| Number | Name | Date |
|---|---|---|
| 1,957,247 | Cockrell | May 1, 1934 |
| 1,971,823 | Long | Aug. 28, 1934 |
| 2,012,821 | King | Aug. 27, 1935 |
| 2,036,286 | Long | Apr. 7, 1936 |
| 2,043,671 | McMaster | June 9, 1936 |
| 2,380,486 | Willis, Jr. | July 31, 1945 |